(12) United States Patent
Schell (10) Patent No.: US 10,706,633 B2
(45) Date of Patent: Jul. 7, 2020

(54) AUGMENTED REALITY SYSTEMS AND METHODS FOR VEHICLE INSPECTION

(71) Applicant: Toyota Motor North America, Inc., Plano, TX (US)

(72) Inventor: Jason Schell, Dallas, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/212,004

(22) Filed: Dec. 6, 2018

(65) Prior Publication Data

US 2020/0184724 A1 Jun. 11, 2020

(51) Int. Cl.
*G06T 19/00* (2011.01)
*G06K 9/00* (2006.01)
*G06K 9/62* (2006.01)

(52) U.S. Cl.
CPC ........ *G06T 19/006* (2013.01); *G06K 9/00671* (2013.01); *G06K 9/6202* (2013.01); *G06K 9/6215* (2013.01); *G06K 2209/23* (2013.01)

(58) Field of Classification Search
None
See application file for complete search history.

(56) References Cited

U.S. PATENT DOCUMENTS

| 9,682,622 B2 | 6/2017 | Kim et al. | |
|---|---|---|---|
| 2013/0070056 A1* | 3/2013 | Tripathi | G06Q 10/06 348/46 |

(Continued)

FOREIGN PATENT DOCUMENTS

| CN | 106569769 A | 4/2017 |
|---|---|---|
| CN | 105182535 B | 4/2018 |

OTHER PUBLICATIONS

"End of the mechanic? BMW smart glasses make it possible for ANYONE to spot and fix a car engine fault just by looking at it," http://www.dailymail.co.uk/sciencetech/article-2543395/The-end-mechanic-Smart-glasses-make-possible-fix-car-engine-just-looking-it.html; Published/Accessed: Jan. 21, 2014.

(Continued)

*Primary Examiner* — Michelle Chin
(74) *Attorney, Agent, or Firm* — Dinsmore & Shohl LLP (57) ABSTRACT

An augmented reality inspection system includes a computing device having a processor and a non-transitory computer readable memory, a camera and display device communicatively coupled to the computing device, and a machine-readable instruction set stored in the non-transitory computer readable memory. The machine-readable instruction set causes the augmented reality inspection system to capture an image of a portion of a vehicle with the camera, compare the image of the portion of the vehicle to an image of an acceptable vehicle configuration, determine whether features within the image of the portion of the vehicle matches at least one acceptable vehicle configuration based on the image of the acceptable vehicle configuration, and in response to determining that the features does not match at least one acceptable vehicle configuration, present on the display device a highlighted portion identifying the features within the image of the portion of the vehicle that does not match.

20 Claims, 8 Drawing Sheets

(56) References Cited

U.S. PATENT DOCUMENTS

| | | |
|---|---|---|
| 2013/0076906 A1* | 3/2013 | Rothschild .............. G08G 1/00 |
| | | 348/148 |
| 2017/0124776 A1 | 5/2017 | Carpentier et al. |
| 2017/0168566 A1 | 6/2017 | Osterhout et al. |

OTHER PUBLICATIONS

"PeopleNet explores augmented reality in trucking, wearable tech for drivers, remotely piloted trucks," https://www.ttnews.com/articles/peoplenet-explores-augmented-reality-trucking-wearable-techdrivers-remotely-piloted-trucks; Published: Oct. 11, 2017.

"Porsche is now using augmented reality glasses to repair cars," https://www.usatoday.com/story/tech/talkingtech/2018/05/29/porsche-now-using-augmented-reality-glasses-repair-cars/648673002/; Published: May 29, 2018.

"With smart glass, law enforcement is stepping into the digital age," https://www.credencys.com/blog/with-smart-glass-law-enforcement-is-stepping-into-the-digital-age/; Accessed/Published: Feb. 20, 2015.

* cited by examiner

AUGMENTED REALITY SYSTEMS AND METHODS FOR VEHICLE INSPECTION

TECHNICAL FIELD

The present specification generally relates to augmented reality systems and methods and, more specifically, augmented reality systems and methods configured to identify non-complaint features of a vehicle and highlight the features via augmented reality to an inspector for further investigation.

BACKGROUND

Presently, inspectors such as border patrol agents, customs agents, emissions technicians, mechanics, and the like rely on a visual inspection process to determine whether features and/or components of a vehicle comply with a standard or acceptable vehicle configuration. However, acceptable features and components of vehicles within a particular make or model of a vehicle can include numerous acceptable variations making it difficult for an inspector to confidently depend on a visual inspection to readily identify non-complaint, illegal, or suspicious vehicle configurations. For example, contraband may be concealed within a vehicle by altering the size and/or shape of vehicle features, which may not be readily noticeable to an inspector. In other instances, non-conforming components such as air filters or exhaust components may be installed to subvert an emissions test. However, these variations may not be noticed during a visual inspection by an inspector.

Accordingly, a need exists for augmented reality systems configured to identify non-complaint features of a vehicle and highlight the features via augmented reality to an inspector for further investigation.

SUMMARY

In one embodiment, an augmented reality inspection system includes a computing device having a processor and a non-transitory computer readable memory, a camera communicatively coupled to the computing device, a display device communicatively coupled to the computing device, and a machine-readable instruction set stored in the non-transitory computer readable memory. The machine-readable instruction set causes the augmented reality inspection system to: capture an image of a portion of a subject vehicle with the camera, compare the image of the portion of the subject vehicle to an image of an acceptable vehicle configuration, determine whether one or more features within the image of the portion of the subject vehicle matches at least one acceptable vehicle configuration based on the image of the acceptable vehicle configuration, and in response to determining that the one or more features does not match at least one acceptable vehicle configuration, present on the display device a first highlighted portion configured to identify the one or more features within the image of the portion of the subject vehicle that does not match.

In some embodiments, an augmented reality inspection system includes a computing device having a processor and a non-transitory computer readable memory, a camera communicatively coupled to the computing device, a display device communicatively coupled to the computing device, and a machine-readable instruction set stored in the non-transitory computer readable memory. The machine-readable instruction set causes the augmented reality inspection system to: capture an image of a portion of a subject vehicle with the camera, compare the image of the portion of the subject vehicle to a repository of images of acceptable vehicle configurations, and determine numeric similarity values for predefined portions of the image of the portion of the subject vehicle, where the numeric similarity values define a similarity measure for the predefined portions of the image of the portion of the subject vehicle as compared to one or more images of the repository of images of acceptable vehicle configurations. The machine-readable instruction set further causes the augmented reality inspection system to: generate a heat map including a first highlighted portion and a second highlighted portion, where the first highlighted portion includes a first color associated with a first numeric similarity value and the second highlighted portion includes a second color associated with a second numeric similarity value, and the first numeric similarity value is different than the second numeric similarity value and present on the display device the heat map overlaid on the image of the portion of the subject vehicle.

In some embodiments, a method of providing an augmented reality inspection of a subject vehicle includes capturing an image of a portion of the subject vehicle with a camera and comparing the image of the portion of the subject vehicle to an image of an acceptable vehicle configuration. The method further includes determining whether one or more features within the image of the portion of the subject vehicle matches at least one acceptable vehicle configuration based on the image of the acceptable vehicle configuration and in response to determining that the one or more features does not match at least one acceptable vehicle configuration, presenting on a display device a first highlighted portion configured to identify the one or more features within the image of the portion of the subject vehicle that does not match.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include augmented reality systems and methods configured to identify non-complaint features of a vehicle and highlight the features via augmented reality to an inspector for further investigation. Generally, these systems and methods utilize a camera, a display device, and image processing algorithms to capture images, compare the captured images to acceptable images, identify portions of the captured images that do not match the acceptable images, and present on the display device, through augmented reality, the potions of the captured image that do not match. As discussed in more detail herein, the display device may include a wearable or handheld device such as augmented reality glasses or a tablet-computing device. Using the camera and display device a user, such as an inspector, a border patrol agent, customs agent, emissions technician, mechanic, or the like, may image portions of a vehicle with the camera and receive through the display device an augmented reality view of the vehicle that identifies non-compliant portions (e.g., structural features, components, or the like) of the vehicle.

The identification of non-compliant portions of the vehicle through an augmented reality view may allow an inspector to readily identify components and/or features that have been modified and that may not conform to acceptable vehicle configurations. It is an increasing challenge for inspectors to visually identify modifications to features or replaced components since the range of acceptable features and components for a particular vehicle can include numerous variations that an inspector must be well-educated and aware of in order to detect the variations. The variations may include a modification to a structural feature of a vehicle that is intended to conceal contraband or an installation of a non-conforming component that may be utilized to subvert an inspection or emissions test. These and other examples may be difficult, if not impossible, for an inspector to detect without directly comparing images and/or dimensions of acceptable vehicle configurations to portions of a vehicle under inspection. However, such a task of manually comparing and inspecting vehicles is not efficient or practical (e.g., especially when processing vehicles through a customs check) and may still be prone to error (e.g., through the oversight of details an inspector is not aware of). However, augmented reality vehicle inspection systems configured to identify non-complaint features of a vehicle and highlight the features via augmented reality to an inspector for further investigation, as described in more detail herein with specific reference to the corresponding drawings, offer a reliable solution.

Figure 1:
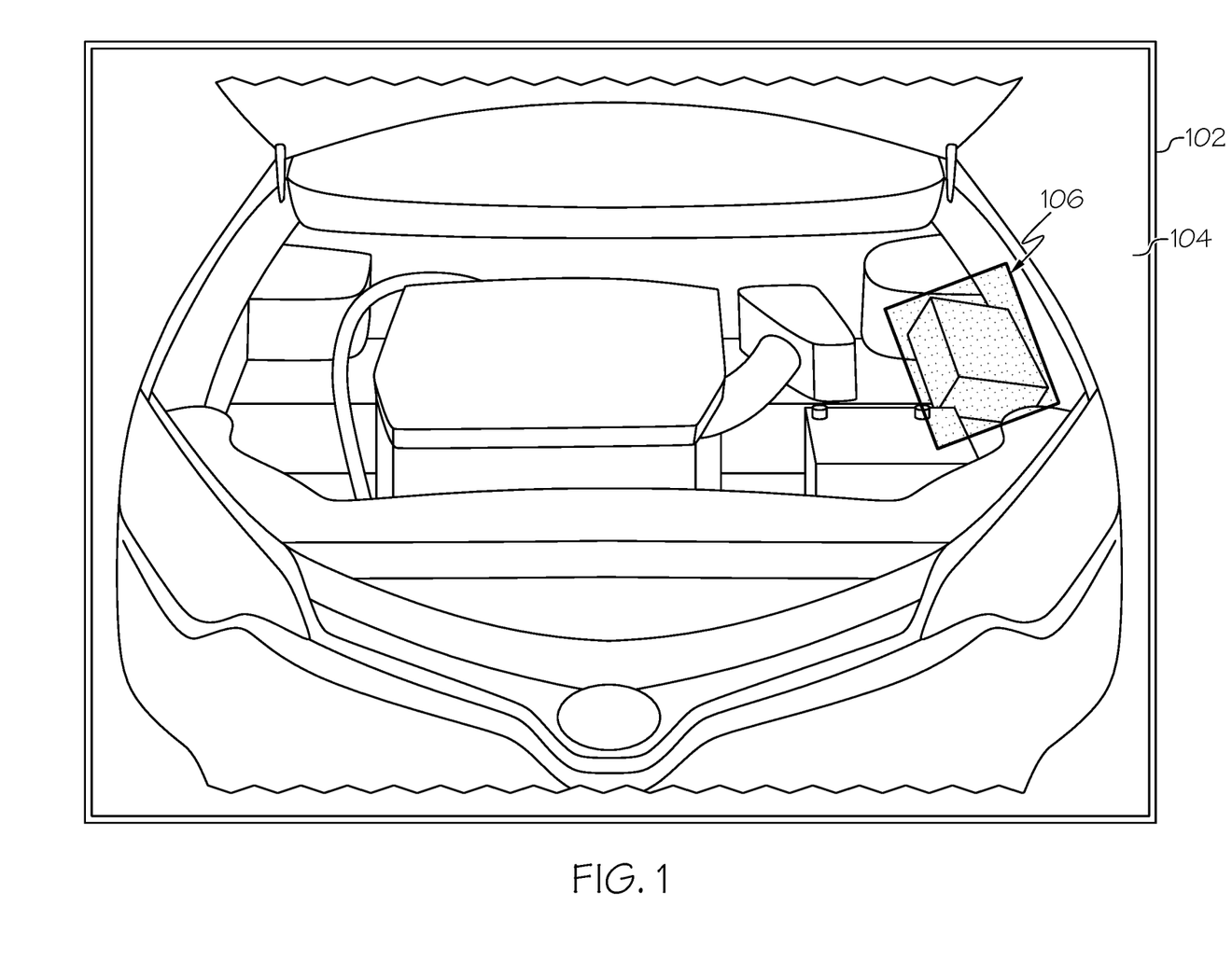
FIG. 1 depicts an illustrative embodiment of an augmented reality overlay presented on a display device according to one or more embodiments shown and described herein.

Turning now to the drawings wherein like numbers refer to like structures, and particularly to FIG. 1, a display device 102 presenting an image 104 of an under-hood view of a vehicle is depicted. An augmented reality overlay including a highlighted portion 106 may be overlaid with the image 104. The highlighted portion 106 may be configured to align with the air filter compartment, which, for example, was identified by the augmented reality vehicle inspection system as a non-compliant component. The image 104 that is displayed may be a live image captured by the camera or may be a previously captured image that is presented on the display device 102 for review by an inspector. In either instance, the highlighted portion 106 generated by the augmented reality vehicle inspection system, which will be described in more detail herein, tracks the portion of the vehicle (e.g., a component or structural feature) that is determined not to match at least one acceptable vehicle configuration predefined for use by the augmented reality vehicle inspection system.

Figure 2:
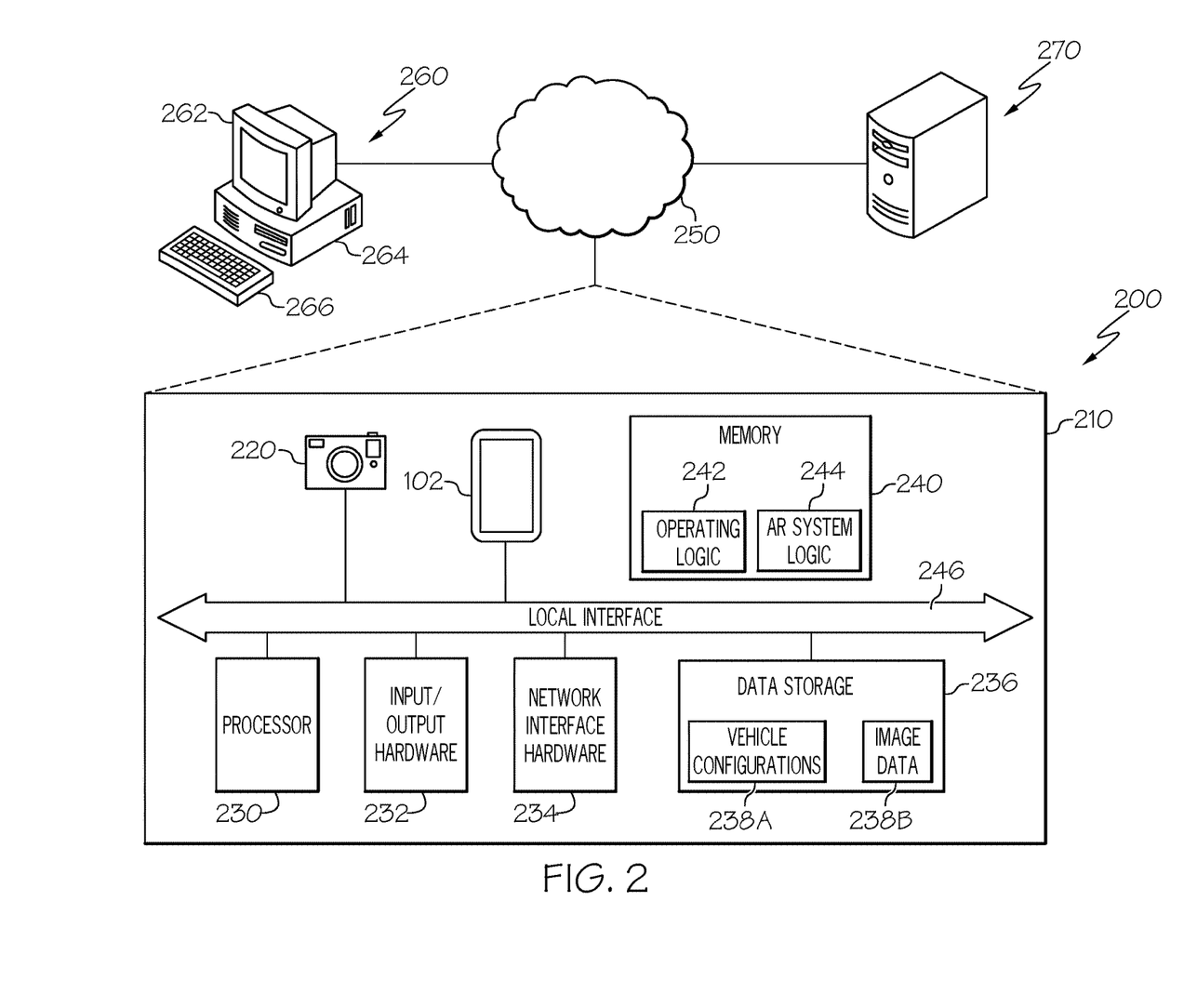
FIG. 2 schematically depicts components of an augmented reality vehicle inspection system according to one or more embodiments shown and described herein.

Referring now to FIG. 2, a schematic 200 of the components of the augmented reality vehicle inspection system 210 is depicted. The augmented reality vehicle inspection system 210 generally includes a camera 220, a display device 102, a processor 230, input/output hardware 232, network interface hardware 234, data storage component 236, and memory component 240. A local interface 246 may also be implemented as a bus or other interface to facilitate communication among the components of the augmented reality vehicle inspection system 210. The augmented reality vehicle inspection system 210 may be connected to a network 250, a remote computing device 260, and/or a server 270.

The camera 220 may be incorporated with the display device 102, for example, as components of a tablet computer, an iPad, wearable glasses or the like. The camera 220 may also be a standalone device. The camera 220 may be any device having an array of sensing devices (e.g., a CCD array or active pixel sensors) capable of detecting radiation in an ultraviolet wavelength band, a visible light wavelength band, or an infrared wavelength band. The camera 220 may have any resolution. The camera 220 may be an omni-direction camera or a panoramic camera. In some embodiments, one or more optical components, such as a mirror, fish-eye lens, or any other type of lens may be optically coupled to the camera 220.

The display device 102 of the augmented reality vehicle inspection system 210 may be any device capable of visually displaying images captured by the camera 220 and an augmented reality overlay. The display device 102 may include any medium capable of transmitting an optical output such as, for example, a cathode ray tube, light emitting diodes, a liquid crystal display, a plasma display, or the like. Moreover, the display device 102 may be a touch-screen that, in addition to providing optical information, detects the presence and location of a tactile input upon a surface of or adjacent to the display device 102. Accordingly, the display device 102 may receive mechanical input directly upon the optical output provided by the display device 102. Additionally, it is noted that the display device 102 can include at least one processor 230 and memory component 240. For example, the display device 102 may be a tablet computer, an iPad, a smartphone, a pair of augmented reality glasses, or the like.

The processor 230 may include any processing component(s) configured to receive and execute programming instructions (such as from the data storage component 236 and/or the memory component 240). The instructions may be in the form of a machine-readable instruction set stored in the data storage component 236 and/or the memory component 240 (e.g., one or more programming instructions). Accordingly, the processor 230 may be an electric controller, an integrated circuit, a microchip, a computer, or any other computing device. The processor 230 is communicatively coupled to the other components of the augmented reality vehicle inspection system 210 through the local interface 246 and/or the network interface hardware 234. Accordingly, the local interface 246 may communicatively couple any number of processors 230 with one another, and allow the components coupled to the local interface 246 to operate in a distributed computing environment. Specifically, each of the components may operate as a node that may send and/or receive data. Furthermore, while the embodiment depicted in FIG. 2 includes a single processor 230, some embodiments may include more than one processor 230.

The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, Wi-Fi card, WiMax card, mobile communications hardware, and/or other hardware for communicating with a network 250 and/or other devices and systems.

The data storage component 236 may be a volatile and/or nonvolatile digital storage component and, as such, may include random access memory (including SRAM, DRAM, and/or other types of random access memory), flash memory, registers, compact discs (CD), digital versatile discs (DVD), and/or other types of storage components. The data storage component 236 may reside local to and/or remote from the augmented reality vehicle inspection system 210 and may be configured to store one or more pieces of data for access by the augmented reality vehicle inspection system 210 and/or other components.

As illustrated in FIG. 2, the data storage component 236 stores, for example, vehicle configurations 238A and image data 238B. The vehicle configurations 238A may include a repository of images of acceptable vehicle configurations. The repository of images of acceptable vehicle configurations may be images of vehicles as manufactured. The images may be classified by make, model, trim package, or the like. The repository of images of acceptable vehicle configurations may also include images of known vehicle configurations having aftermarket components or changes to structural features. However, while these known vehicle configurations may be included in the repository of images of acceptable vehicle configurations, when they are identified by the augmented reality vehicle inspection system 210 they may still be identified and highlighted for further review by the inspector, which will be discussed in more detail herein. In some embodiments, the vehicle configurations 238A may include design specifications such as dimensions for particular vehicle makes, models, and/or trim packages. The dimensions may also be defined by rules and regulations. As described in more detail herein, dimensions may be extracted from images captured of the vehicle by the camera 220 and compared to the dimensions stored in the acceptable vehicle configurations in the data storage component 236.

The data storage component 236 may further include image data 238B that is captured by the camera 220. The image data 238B may be captured by the camera 220 and stored in the data storage component 236. In some embodiments, the image data 238B that is captured by the camera 220 may be transmitted through a network 250 to a data storage component 236 that is located at a remote location from the augmented reality vehicle inspection system 210.

The memory component 240 may be machine-readable memory (which may also be referred to as a non-transitory processor readable memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242 and augmented reality inspection logic 244 ("AR Logic), each of which may be embodied as a computer program, firmware, or hardware, as an example, and will be described in more detail herein.

The operating logic 242 may include an operating system and/or other software for managing components of the augmented reality vehicle inspection system 210. The AR logic 244 may include logic specific to carrying out functions of the augmented reality vehicle inspection system 210, for example, which will be described in more specific detail with respect to FIGS. 5 and 6.

Still referring to FIG. 2, it should be understood that the augmented reality vehicle inspection system 210 may be communicatively coupled to a network 250, a remote computing device 260, and/or a server 270. The network 250 may include a wide area network, such as the internet, a local area network (LAN), a mobile communications network, a public service telephone network (PSTN) and/or other network. The remote computing device 260 may include a display 262, a processing unit 264 and an input device 266, each of which may be communicatively coupled together and/or to the network 250. The remote computing device 260 may be used to interface with a front-end application, which may provide control and/or interaction with the augmented reality vehicle inspection system 210. In some embodiments, one or more user remote computing devices 260 may be implemented so that one or more users may interact with the augmented reality vehicle inspection system 210.

Additionally, a server 270 may be communicatively coupled through the network 250 to the augmented reality vehicle inspection system 210. The server 270 may provide processing resources, data storage, administrator supervision or the like to the augmented reality vehicle inspection system 210.

It should be understood that while the remote computing device 260 and the server 270 are depicted as personal computers and a server 270, respectively, these are merely examples. More specifically, any type of computing device (e.g., mobile computing device, personal computer, server 270, and the like) may be utilized for any of these components. Additionally, while each of these computing devices and the augmented reality vehicle inspection system 210 is illustrated in FIG. 2 as a single piece of hardware, this is also an example. More specifically, each of the remote computing device 260, the server 270, and the augmented reality vehicle inspection system 210 may represent a plurality of computers, servers, databases, and the like operating in a distributed computing configuration to form the augmented reality vehicle inspection system 210.

Figure 3A:
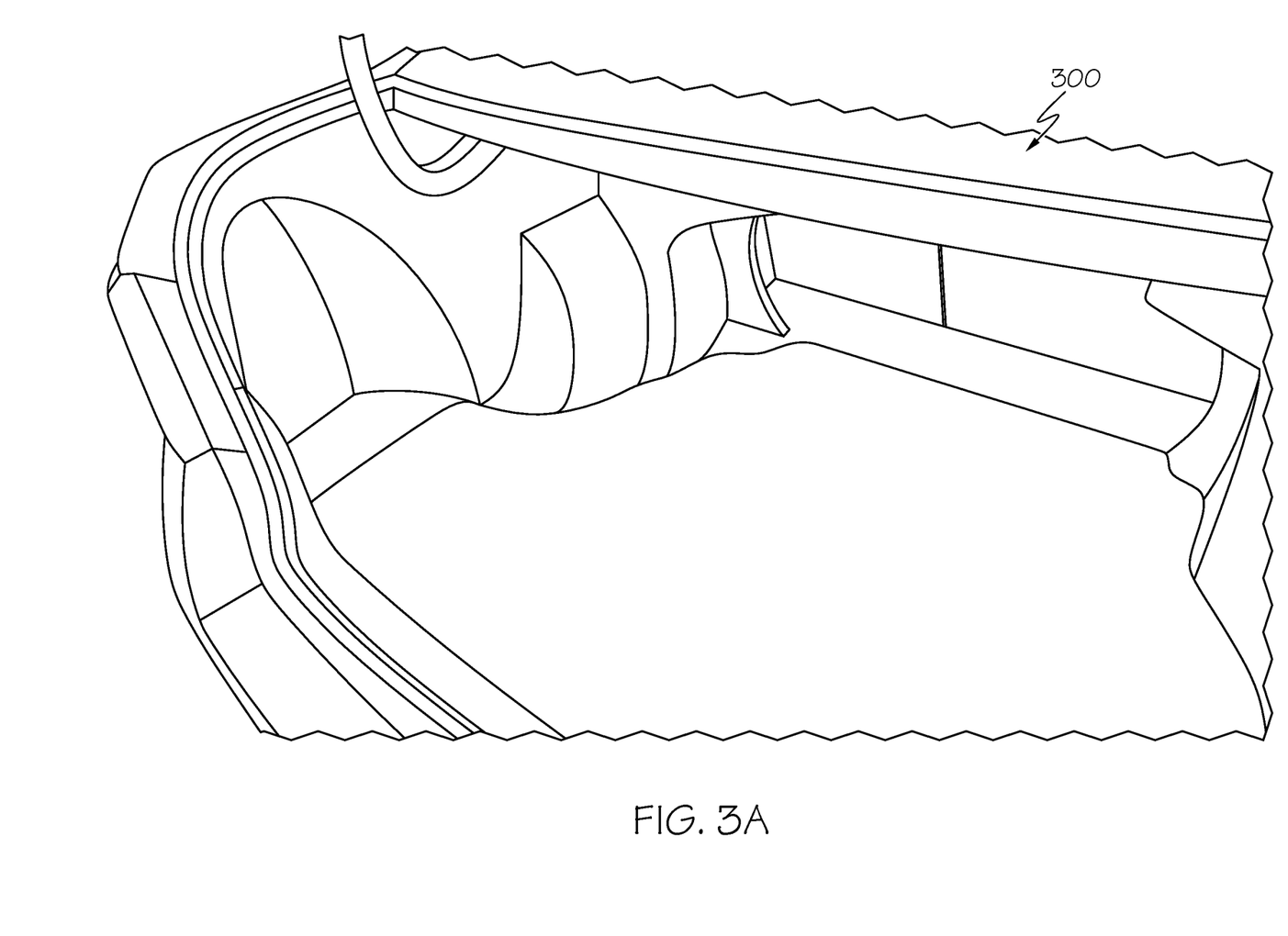
FIG. 3A depicts an example image of an acceptable vehicle configuration of a trunk according to one or more embodiments shown and described herein.
Figure 3B:
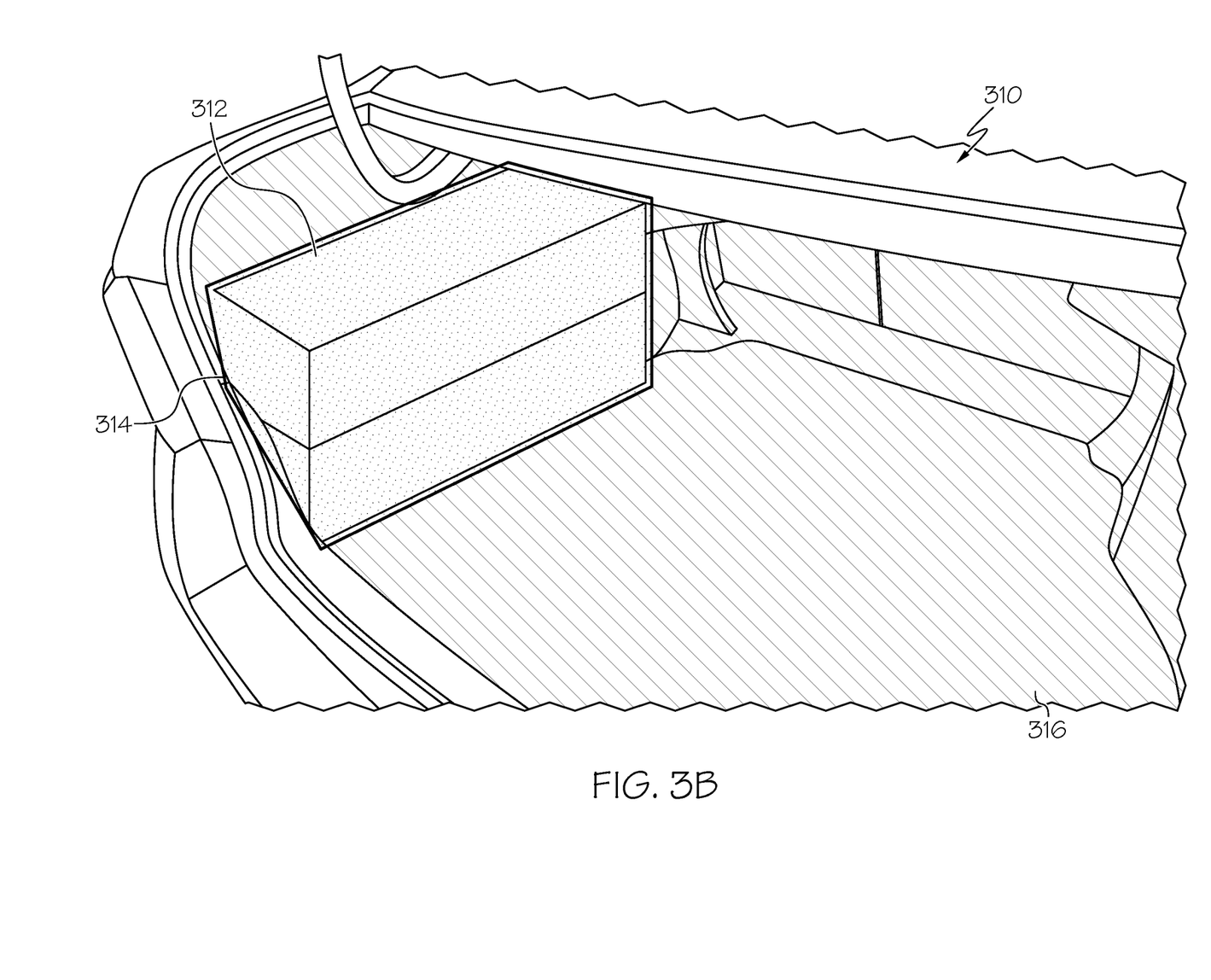
FIG. 3B depicts an example image of a subject trunk of a subject vehicle being inspected with the augmented reality vehicle inspection system according to one or more embodiments shown and described herein.

Turning now to FIGS. 3A and 3B, an example image of an acceptable vehicle configuration (FIG. 3A) and an example of an image of a portion of a vehicle (FIG. 3B) are depicted for purposes of generally describing the functionality of the augmented reality vehicle inspection system. In particular, FIG. 3A depicts an image of an acceptable trunk 300 that is an acceptable vehicle configuration. FIG. 3B depicts an image of a subject trunk 310 of a subject vehicle being inspected. The subject trunk 310 of the subject vehicle includes a structural feature 312 that does not match the structural features of the acceptable trunk 300. In particular, the structural feature 312 that is depicted is an extended compartment made to appear like the rest of the trunk and may be used to conceal contraband from view. Such a configuration may appear normal (e.g., may appear to be a wheel well cover or the storage location of a spare tire or jack equipment) to an inspector, unless the inspector is very familiar with the particular vehicle being inspected.

In operation, the augmented reality vehicle inspection system may capture an image of the subject trunk 310 with a camera and compare the image of the subject trunk 310 with images of acceptable vehicle configurations. The augmented reality vehicle inspection system may utilize any one of a number of image comparison techniques to determine whether the image of the subject trunk 310 matches one or more of the images or dimensions stored defined by the acceptable vehicle configurations. For example, the augmented reality vehicle inspection system may utilize a machine learning data structure such as a deep belief network that is trained on images of acceptable vehicle configurations. In some embodiments, the augmented reality vehicle inspection system may utilize object and image detection and recognition techniques such as scale-invariant feature transform ("SIFT"), speeded up robust features ("SURF"), Blob detection methods, and edge-detection algorithms. Such algorithms may identify features and/or detect objects within the image of the subject trunk 310 and extract the features and objects for comparison to images of trunks stored in the repository of images of acceptable vehicle configurations.

In the event the augmented reality vehicle inspection system determines a portion of the image of the subject trunk 310 includes a feature that is not defined by the acceptable vehicle configurations, an augmented reality overlay may be generated. The augmented reality overlay may be implemented through a variety of means. In one example, the augmented reality overlay may include a highlighted portion having one or more colored portions that are configured to overlay the portion of the image of the subject trunk 310 that does not match (i.e., non-compliant) an acceptable vehicle configuration. For example, referring to FIG. 3B, a first highlighted portion 314 may be presented in a semi-transparent red highlight over the structural feature 312 that is non-compliant. In some embodiments, a second highlighted portion 316 may include a second color that is different than the first color implemented by the first highlighted portion 314 to indicate portions of the subject trunk 310 that do match (i.e., conform) to an acceptable vehicle configuration. In some embodiments, two or more highlighted portions may form a heat map, which will be described in more detail herein. It should be understood that while the highlighted portions described herein refer to semi-transparent overlays that form the augmented reality overlay and which the live or still image captured by the camera is viewed through the highlighted portions may include other forms. For example, the highlighted portions may be defined by an outline or border (e.g., a closed contour shape) that is formed around the portions of image of the subject trunk 310. The outline or border may include a color such as red for indicating areas of interest and a color such as green for areas that conform to an acceptable vehicle configuration and do not require further inspection.

Figure 4A:
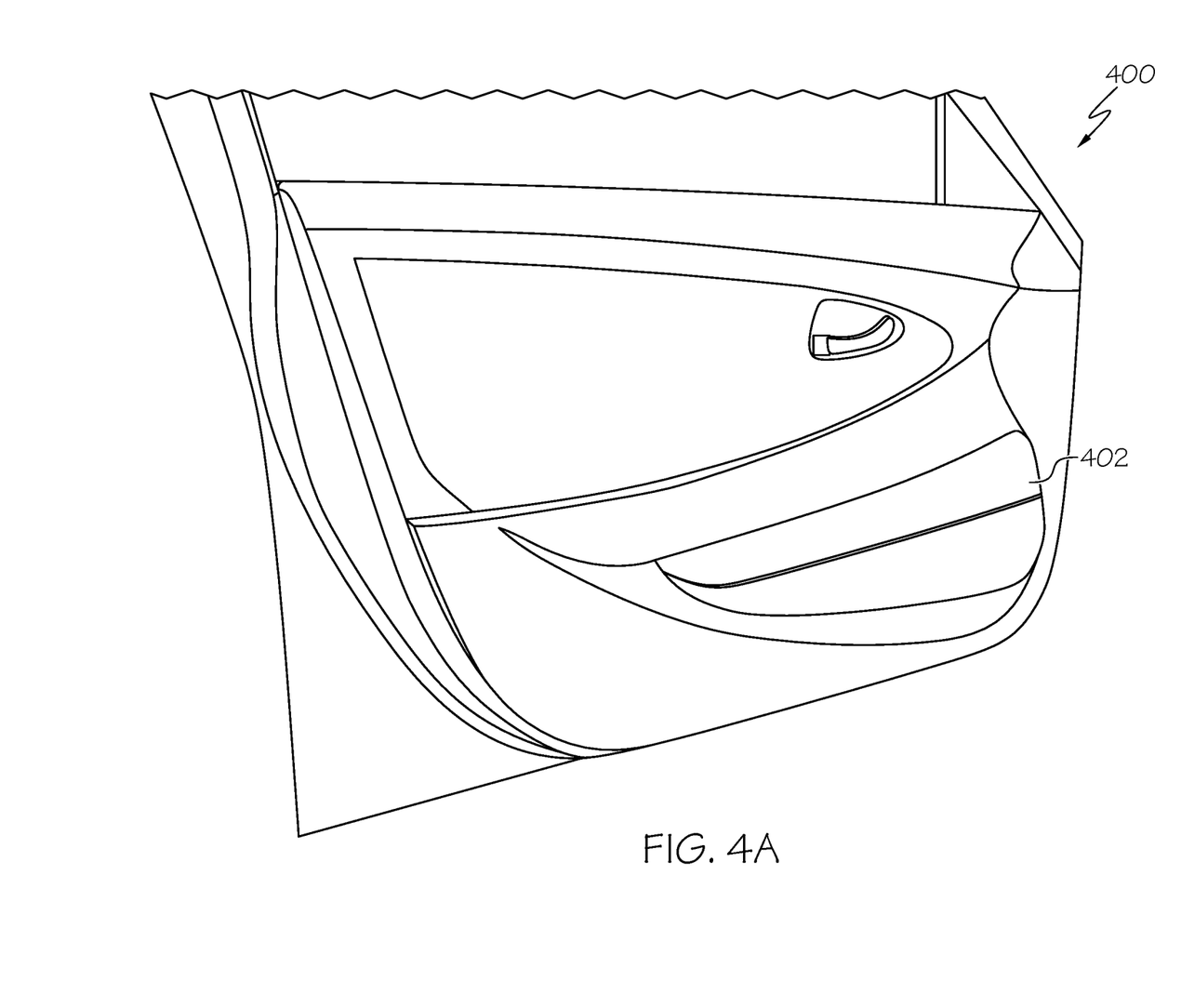
FIG. 4A depicts an example image of an acceptable vehicle configuration of a door according to one or more embodiments shown and described herein.
Figure 4B:
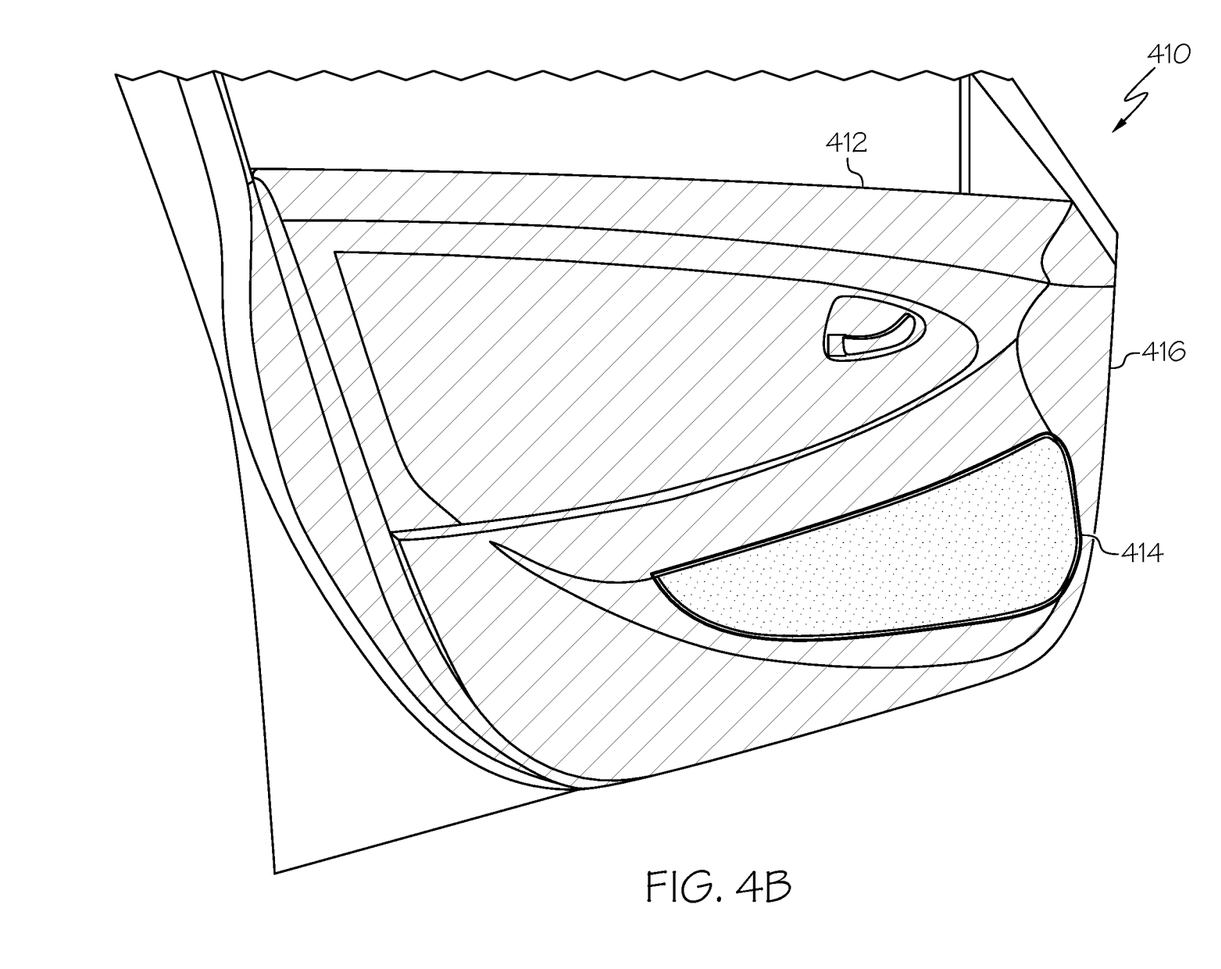
FIG. 4B depicts an example image of a subject door of a subject vehicle being inspected with the augmented reality vehicle inspection system according to one or more embodiments shown and described herein.

Referring now to FIGS. 4A and 4B, another example image of an acceptable vehicle configuration (FIG. 4A) and an example image of a portion of a subject vehicle (FIG. 4B) are depicted. In particular, FIG. 4A depicts an image of an acceptable door 400 that is an acceptable vehicle configuration and FIG. 4B depicts an image of a subject door 410 of a subject vehicle being inspected. The subject door 410 of the subject vehicle does not include the door pocket 402 (FIG. 4A) defined in the acceptable door 400. That is, the door panel of the subject vehicle has been modified. This modification may create a concealed compartment within the subject door 410. As discussed above, the augmented reality vehicle inspection system may determine whether there are any differences and highlight the differences through augmented reality on a display device so that an inspector may further review the difference. For example, a first highlighted portion 414 is generated and presented over the portion of the subject door of the subject vehicle that does not match an acceptable vehicle configuration. In some embodiments, a second highlighted portion 416 may be generated and presented over the portion of the subject door of the subject vehicle that does match an acceptable vehicle configuration. In general, by presenting an augmented reality overlay, for example, one or more highlighted portions with the image of the subject door, differences or areas requiring further inspection may be readily identified.

Figure 5:
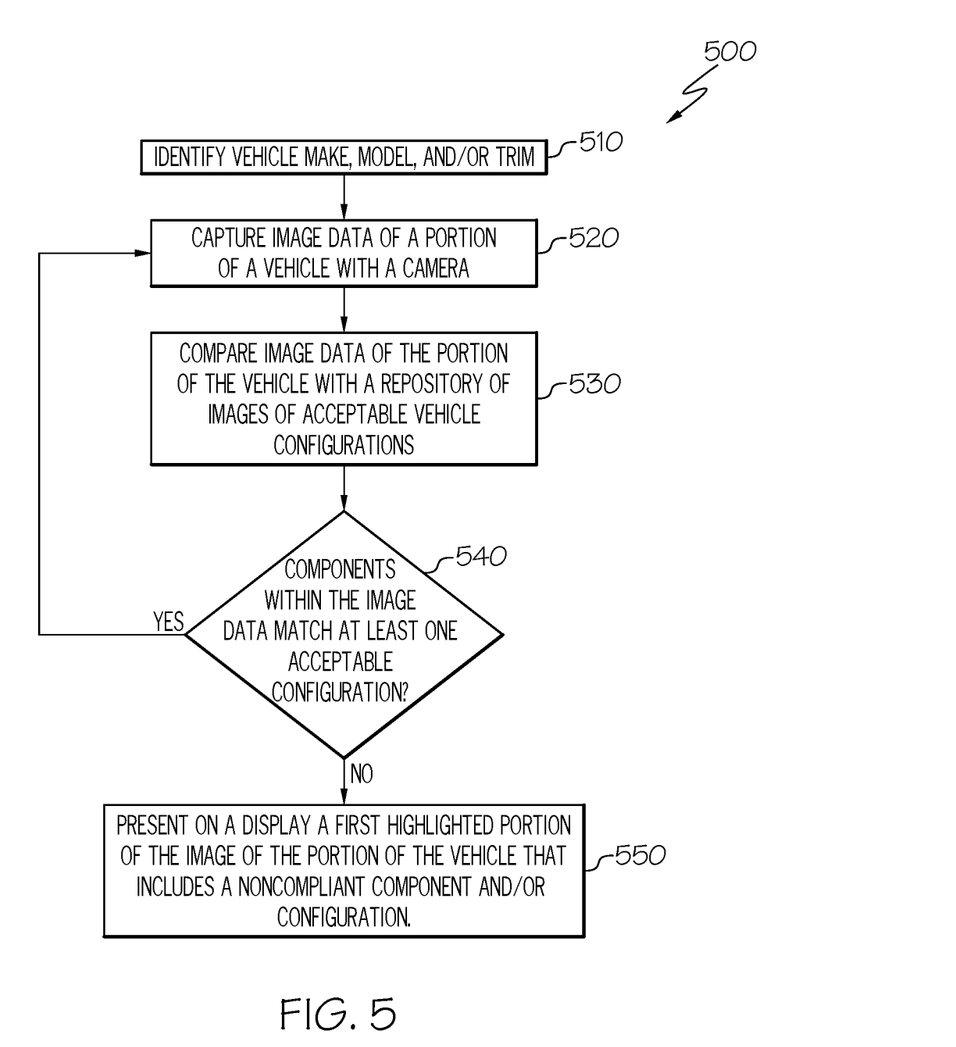
FIG. 5 depicts a flowchart of an example method for the augmented reality vehicle inspection system according to one or more embodiments shown and described herein.
Figure 6:
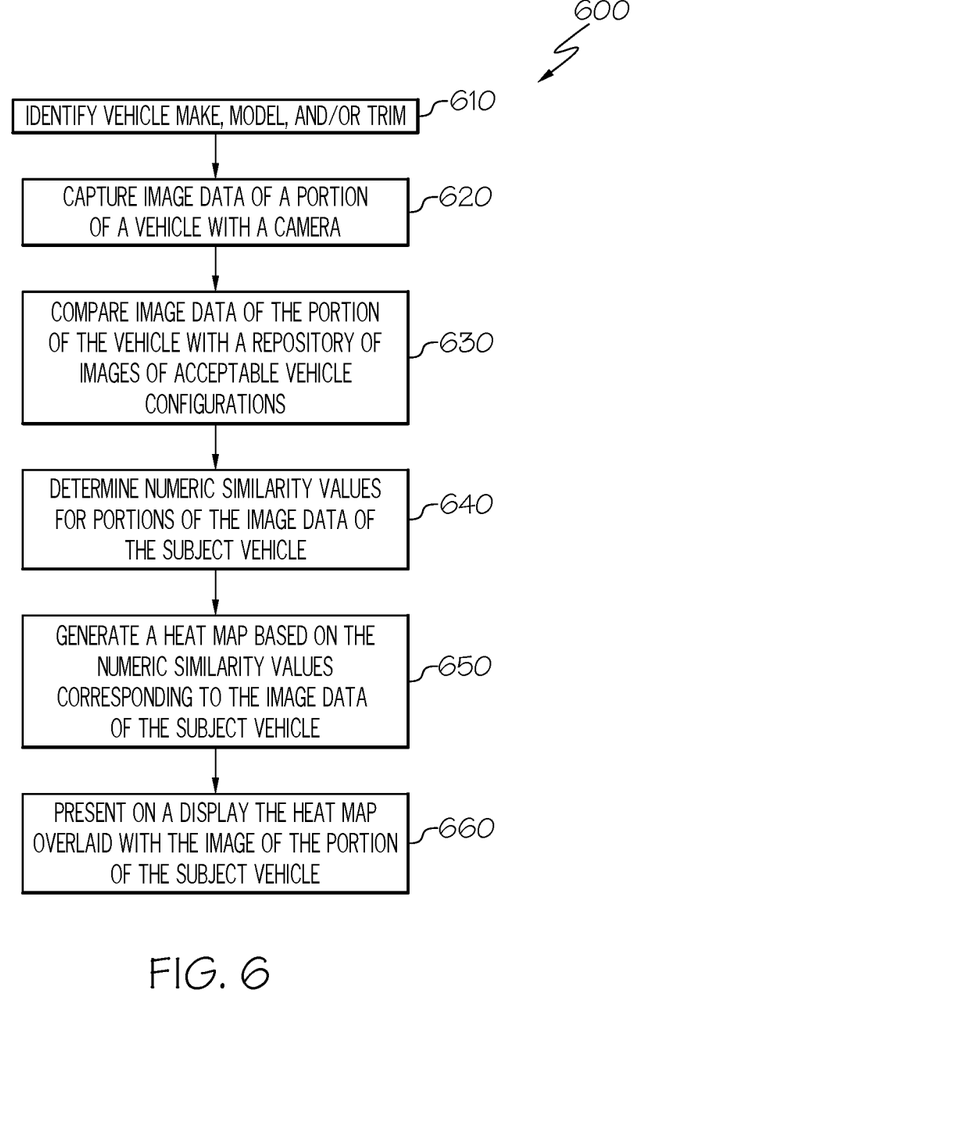
FIG. 6 depicts a flowchart of another example method for the augmented reality vehicle inspection system according to one or more embodiments shown and described herein.

Referring now to FIGS. 5 and 6, two flowcharts 500 and 600 of example methods implemented in the AR logic of the augmented reality vehicle inspection system will now be described. Referring first to FIG. 5, at block 510 of the flowchart 500, the augmented reality vehicle inspection system may identify a make, model, and/or trim package of the subject vehicle that is being inspected. Identification of the subject vehicle may be accomplished through an alphanumeric input of the vehicle identification number (VIN) into the system, through capturing a picture of the VIN (e.g., the VIN barcode) with the camera 220, through image recognition whereby the camera 220 captures one or more images of the subject vehicle that include identifying features or tags (e.g., the license plate), or any other means of identification. In embodiments where the make, model, and/or trim package of a subject vehicle is identified the system may select a sub-group of the repository of images of acceptable vehicle configurations that correspond to the particular make, model, and/or trim package of the vehicle. The sub-group of the repository of images of acceptable vehicle configurations may reduce the set of images the system may need to analyze when comparing and determining whether an image of the subject vehicle matches an acceptable vehicle configuration. The augmented reality vehicle inspection system may capture image data of a portion of the subject vehicle with the camera 220, at block 520. The image data may be stored in the data storage component until it is processed by the augmented reality vehicle inspection system, as will be described in the below steps, or may be automatically processed in real-time or near-real time so that an inspector may utilize the augmented reality vehicle inspection system while actively inspecting the subject vehicle. For example, the augmented reality vehicle inspection system may provide augmented display overlays on the live images being viewed by the inspector through the display device.

When processed, the image data of the portion of the subject vehicle is compared to a repository of images of acceptable vehicle configurations, at block 530. In some embodiments, the image comparison algorithm that is implemented may logically compare the image data of the portion of the subject vehicle to multiple images within the repository of images of acceptable vehicle configurations. However, in some embodiments, a sub-group of images may be selected in the case where the make, model, trim package, and/or other classifications such as the type of vehicle (e.g., sedan, sports utility vehicle, and truck) may be known or input into the system. Furthermore, where the image comparison step implements a machine learning data structure such as a deep belief network for comparing and determining whether the image data of the subject vehicle matches an acceptable vehicle configuration, it may not be necessary to reduce the repository of images of acceptable vehicle configurations since the machine learning algorithm may be trained to determine similarities and difference in images for multiple vehicle types, makes, models, and/or trim packages.

The augmented reality vehicle inspection system further determines whether one or more features within the image data of the portion of the subject vehicle matches at least one acceptable vehicle configuration based on the images of acceptable vehicle configurations, at block 540. In the event the image data of the portion of the subject vehicle includes an acceptable vehicle configuration, the augmented reality vehicle inspection system may provide an indication such as a green highlighted portion over the image of the subject vehicle or other approval indication and may further proceed with receiving and analyzing additional image data captured by the camera of other portions of the subject vehicle. However, when a feature within the image data of the portion of the subject vehicle does not match (i.e., determined to be non-compliant) with an acceptable vehicle configuration, at block 540, then at block 550 the augmented reality vehicle inspection system may present on the display device an augmented reality overlay indicating the portion of the vehicle that does not comply with an acceptable vehicle configuration. For example, a first highlighted portion of the image data of the portion of the subject vehicle that includes the non-complaint feature and/or component may be generated and displayed as an augmented reality overlay with the image data so that an inspector (i.e., a user) may view both the portion of the subject vehicle and the highlighted portion that requires further inspection.

In some embodiments, the augmented reality vehicle inspection system, for purposes of comparing a portion of a subject vehicle to acceptable vehicle configurations, as in blocks 530 and 540, may extract one of more dimensions of the subject vehicle from the image data. The one or more dimensions of the subject vehicle may be compared to acceptable dimensions defined by a rule, a regulation, and/or a design specification within the acceptable vehicle configuration data set of the system. The augmented reality vehicle inspection system may utilize the one or more dimensions to determine whether a feature or a portion of the subject vehicle is complaint to an acceptable vehicle configuration. For example, the augmented reality vehicle inspection system may be used to perform pre-race and/or post-race compliance checks of racecars. Race rules typically control the dimensions of various features of a racecar, which must be maintained throughout a race. Through the use of an augmented reality vehicle inspection system, dimensions as well as features of a racecar may be quickly and efficiently confirmed before and/or after a race. The race context is only one example where dimensions through inspection are confirmed. Others may include dimension checks during an emissions evaluation or customs check to determine if the size of a vehicle has been modified.

Referring now to FIG. 6, a second flowchart 600 that may be implemented as the AR logic for an augmented reality vehicle inspection system is depicted. Similar to the previously described method, the augmented reality vehicle inspection system may identify a vehicle make, model, and/or trim package that is being inspecting, at block 610. The identification of the vehicle may be accomplished through input of the vehicle identification number (VIN) into the system, through capturing a picture of the VIN with the camera 220, through image recognition whereby the camera 220 captures one or more images of the subject vehicle that include identifying features or tags (e.g., the license plate), or any other means of identification. The augmented reality vehicle inspection system may capture image data of a portion of the subject vehicle with the camera 220, at block 620. Portions of the vehicle may include views from under the hood and under the vehicle, the doors, the interior cabin, the trunk, and the like. The image data may be stored in the data storage component until it is processed by the augmented reality vehicle inspection system or may be processed in real-time or near-real time so that an inspector may utilize the augmented reality vehicle inspection system while actively inspecting the subject vehicle. For example, the augmented reality vehicle inspection system may provide augmented display overlays on the live images being viewed by the inspector through the display device.

When processed, the image data of the portion of the subject vehicle is compared to a repository of images of acceptable vehicle configurations, at block 630. In some embodiments, the image comparison algorithm that is implemented may logically compare the image data of the portion of the subject vehicle to multiple images within the repository of images of acceptable vehicle configurations. However, in some embodiments, a sub-group of images may be selected in the case where the make, model, trim package, and/or other classifications such as the type of vehicle (e.g., sedan, sports utility vehicle, and truck) may be known or input into the system. Furthermore, where the image comparison step implements a machine learning data structure such as a deep belief network for comparing and determining whether the image data of the subject vehicle matches an acceptable vehicle configuration, it may not be necessary to reduce the repository of images of acceptable vehicle configurations since the machine learning algorithm may be trained to determine similarities and difference in images for multiple vehicle types, makes, models, and/or trim packages.

The image comparison technique employed by the system may further determine a numeric similarity value for a portion of the image data of the subject vehicle as it relates to an acceptable vehicle configuration, at block 640. That is, in some embodiments, the comparison between a portion of the image data of the subject vehicle and the acceptable vehicle configurations may be scored, for example, from 0 to 100, based on how similar the portion of the image data of the subject vehicle is determined to be with an acceptable vehicle configuration. The image data may be scored with a numeric similarity value based on the entire image or multiple numeric similarity values may be determined for predefined portions of the image data of the subject vehicle. For example, the image data of the subject vehicle may be defined by a grid space where each cell of the gird space is assigned a numeric similarity score based on how similar the image data of the subject vehicle within that cell is to an acceptable vehicle configuration. In other embodiments, that image data may be defined through object detection and segmentation where independent components within the image data of the subject vehicle are assigned numeric similarity values.

The determination of numeric similarity values for portions of the image data may provide an inspector additional confidence and/or detail when inspecting the subject vehicle. For example, differences between a subject vehicle and the acceptable vehicle configurations may arise due to wear and tear of the vehicle, images of components captured from angles or distances that are different from those that make up the repository of images of acceptable vehicle configurations, differences in lighting, or the like. These variations may contribute to the dissimilarity of portions of the subject vehicle when compared to acceptable vehicle configurations. However, these differences may not be indicative of an alteration or difference that is a result of a deliberate change in components or features of the subject vehicle. Additionally, by determining and assigning a numeric similarity values to portions of the image data of the subject vehicle based on their similarity to the acceptable vehicle configuration, a heat map may be generated, at block 650.

The heat map may include one or more highlighted portions where each highlighted portion includes a different color. The color of the highlight portion corresponds to a numeric similarity value, which may be associated with a predefined range of colors. For example, the color red may be associated with numeric similarity values of 0 to 30, the color yellow may be associated with numeric similarity values of 31 to 50, the color orange may be associated with numeric similarity values of 51 to 80, the color green may be associated with numeric similarity values of 81 to 100. It should be understood that other scaling and other colors may be defined in the predefined range of colors and associated numeric similarity values.

The heat map, similar to the highlighted portions discussed above, may be configured and presented as an augmented reality overlay on the image data of the subject vehicle on a display device, at block 660. The heat map as displayed with the image data of the subject may be viewed in real-time or near real-time by an inspector so that the inspector may determine whether further inspection of a portion of the subject vehicle is necessary.

For example, referring back to FIGS. 3B and 4B, two different examples implementing a heat map having two highlighted portions is illustrated. In some embodiments, the heat map may include a first highlighted portion 314 (FIG. 3B) and 414 (FIG. 4B) and a second highlighted portion 316 (FIG. 3B) and 416 (FIG. 4B). The first highlighted portion 314 and 414 may include a first color associated with a first numeric similarity value and the second highlighted portion 316 and 416 may include a second color associated with a second numeric similarity value. For example, the first highlighted portion 314 and 414 may include a green color indicating that the features visible through the first highlighted portion 314 and 414 conform to the acceptable vehicle configurations. The second highlighted portion 316 and 416 may include a red color indicating that the features visible through the second highlighted portion 316 and 416 do not conform to the acceptable vehicle configurations. As a result, the augmented reality image that is presented on the display device indicates at least one portion of the subject vehicle the inspector should further inspect.

It should now be understood that embodiments described herein are directed to augmented reality vehicle inspection systems and methods. The augmented reality vehicle inspection systems and methods may utilize a camera and display device to capture images of a subject vehicle and compare the images with acceptable vehicle configurations to determine whether the image of the subject vehicle includes feature that do not match the acceptable vehicle configurations. When features or portions of the image of the subject vehicle are determined to not match an acceptable vehicle configuration an augmented reality overlay may be generated and presented with the image of the subject vehicle through the display device. The user, for example, an inspector, may utilize the augmented reality vehicle inspection systems to efficiently and accurately inspect a subject vehicle for non-compliant features and/or components.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An augmented reality inspection system comprising:
   a computing device having a processor and a non-transitory computer readable memory;
   a camera communicatively coupled to the computing device;
   a display device communicatively coupled to the computing device; and
   a machine-readable instruction set stored in the non-transitory computer readable memory that causes the augmented reality inspection system to perform at least the following when executed by the processor:
   capture an image of a portion of a subject vehicle with the camera,
   compare the image of the portion of the subject vehicle to an image of an acceptable vehicle configuration,
   determine whether one or more features within the image of the portion of the subject vehicle matches at least one acceptable vehicle configuration based on the image of the acceptable vehicle configuration, and
   in response to determining that the one or more features does not match at least one acceptable vehicle configuration, present on the display device a first highlighted portion configured to identify the one or more features within the image of the portion of the subject vehicle that does not match.

2. The augmented reality inspection system of claim 1, wherein the first highlighted portion includes a semi-transparent colored overlay aligned with the one or more features within the image of the portion of the subject vehicle that does not match.

3. The augmented reality inspection system of claim 1, wherein the machine-readable instruction set, when executed, further causes the augmented reality inspection system to:
   determine a numeric similarity value for at least one of the one or more features within the image of the portion of the subject vehicle based on a similarity of the at least one of the one or more features to the image of the acceptable vehicle configuration, and
   wherein the first highlighted portion includes a first color associated with the numeric similarity value selected from a predefined range of colors associated with a predefined range of numeric similarity values.

4. The augmented reality inspection system of claim 1, wherein the machine-readable instruction set, when executed, further causes the augmented reality inspection system to:
  identify at least one of a make, a model, or a trim package of the subject vehicle, and
  select a sub-group of images of acceptable vehicle configurations that correspond to the at least one of the make, the model, or the trim package of the subject vehicle such that the image of the portion of the subject vehicle captured by the camera is compared to the sub-group of images of acceptable vehicle configurations.

5. The augmented reality inspection system of claim 4, wherein identifying at least one or the make, the model, or the trim package of the subject vehicle includes receiving a VIN of the subject vehicle from at least one of the camera or an input device.

6. The augmented reality inspection system of claim 1, wherein the machine-readable instruction set, when executed, further causes the augmented reality inspection system to:
  identify at least one of a make, a model, or a trim package of the subject vehicle,
  extract one or more dimensions of the subject vehicle from the image of the portion of the subject vehicle, and
  compare the one or more dimensions of the subject vehicle to acceptable dimensions defined by at least one of a rule, a regulation, or a design specification, and
  wherein determining whether the one or more features within the image of the portion of the subject vehicle matches at least one acceptable vehicle configuration is further based on whether the one or more dimensions of the subject vehicle matches the acceptable dimensions defined by at least one of the rule, the regulation, or the design specification.

7. The augmented reality inspection system of claim 1, wherein the display device presents the image of the portion of the subject vehicle as a live feed from the camera.

8. An augmented reality inspection system comprising:
  a computing device having a processor and a non-transitory computer readable memory;
  a camera communicatively coupled to the computing device;
  a display device communicatively coupled to the computing device; and
  a machine-readable instruction set stored in the non-transitory computer readable memory that causes the augmented reality inspection system to perform at least the following when executed by the processor:
    capture an image of a portion of a subject vehicle with the camera,
    compare the image of the portion of the subject vehicle to a repository of images of acceptable vehicle configurations,
    determine numeric similarity values for predefined portions of the image of the portion of the subject vehicle, wherein the numeric similarity values define a similarity measure for the predefined portions of the image of the portion of the subject vehicle as compared to one or more images of the repository of images of acceptable vehicle configurations,
    generate a heat map including a first highlighted portion and a second highlighted portion, wherein the first highlighted portion includes a first color associated with a first numeric similarity value and the second highlighted portion includes a second color associated with a second numeric similarity value, and the first numeric similarity value is different than the second numeric similarity value, and
    present on the display device the heat map overlaid on the image of the portion of the subject vehicle.

9. The augmented reality inspection system of claim 8, wherein a pair of augmented reality glasses is configured as the display device.

10. The augmented reality inspection system of claim 8, wherein the machine-readable instruction set, when executed, further causes the augmented reality inspection system to:
  identify at least one of a make, a model, or a trim package of the subject vehicle, and
  select a sub-group of the repository of images of acceptable vehicle configurations that correspond to the at least one of the make, the model, or the trim package of the subject vehicle such that the image of the portion of the subject vehicle captured by the camera is compared to the sub-group of the repository of images of acceptable vehicle configurations.

11. The augmented reality inspection system of claim 10, wherein identifying at least one or the make, the model, or the trim package of the subject vehicle includes receiving a VIN of the subject vehicle.

12. The augmented reality inspection system of claim 8, wherein the machine-readable instruction set, when executed, further causes the augmented reality inspection system to:
  identify at least one of a make, a model, or a trim package of the subject vehicle,
  extract one or more dimensions of the subject vehicle from the image of the portion of the subject vehicle, and
  compare the one or more dimensions of the subject vehicle to acceptable dimensions defined by at least one of a rule, a regulation, or a design specification,
  wherein determining whether one or more features within the image of the portion of the subject vehicle matches at least one acceptable vehicle configuration is further based on whether the one or more dimensions of the subject vehicle matches the acceptable dimensions defined by at least one of the rule, the regulation, or the design specification.

13. The augmented reality inspection system of claim 8, wherein the display device presents the image of the portion of the subject vehicle as a live feed from the camera.

14. A method of providing an augmented reality inspection of a subject vehicle, the method comprising:
  capturing an image of a portion of the subject vehicle with a camera;
  comparing the image of the portion of the subject vehicle to an image of an acceptable vehicle configuration;
  determining whether one or more features within the image of the portion of the subject vehicle matches at least one acceptable vehicle configuration based on the image of the acceptable vehicle configuration; and
  in response to determining that the one or more features does not match at least one acceptable vehicle configuration, presenting on a display device a first highlighted portion configured to identify the one or more features within the image of the portion of the subject vehicle that does not match.

15. The method of claim 14, wherein the first highlighted portion includes a semi-transparent colored overlay aligned with the one or more features within the image of the portion of the subject vehicle that does not match.

16. The method of claim 14, further comprising:
determining a numeric similarity value for at least one of the one or more features within the image of the portion of the subject vehicle based on a similarity of the at least one of the one or more features to the image of the acceptable vehicle configuration,
wherein the first highlighted portion includes a first color associated with the numeric similarity value selected from a predefined range of colors associated with a predefined range of numeric similarity values.

17. The method of claim 14, further comprising:
identifying at least one of a make, a model, or a trim package of the subject vehicle, and
selecting a sub-group of images of acceptable vehicle configurations that correspond to the at least one of the make, the model, or the trim package of the subject vehicle such that the image of the portion of the subject vehicle captured by the camera is compared to the sub-group of images of acceptable vehicle configurations.

18. The method of claim 17, wherein identifying at least one or the make, the model, or the trim package of the subject vehicle includes receiving a VIN of the subject vehicle from at least one of the camera or an input device.

19. The method of claim 14, further comprising:
identifying at least one of a make, a model, or a trim package of the subject vehicle,
extracting one or more dimensions of the subject vehicle from the image of the portion of the subject vehicle, and
comparing the one or more dimensions of the subject vehicle to acceptable dimensions defined by at least one or a rule, a regulation, or a design specification,
wherein determining whether the one or more features within the image of the portion of the subject vehicle matches at least one acceptable vehicle configuration is further based on whether the one or more dimensions of the subject vehicle matches the acceptable dimensions defined by at least one of the rule, the regulation, or the design specification.

20. The method of claim 14, wherein the display device presents the image of the portion of the subject vehicle as a live feed from the camera.

* * * * *

UNITED STATES PATENT AND TRADEMARK OFFICE
CERTIFICATE OF CORRECTION

| | |
|---|---|
| PATENT NO. | : 10,706,633 B2 |
| APPLICATION NO. | : 16/212004 |
| DATED | : July 7, 2020 |
| INVENTOR(S) | : Jason Schell |

It is certified that error appears in the above-identified patent and that said Letters Patent is hereby corrected as shown below:

On the Title Page

Item (73), Assignee, delete "Toyota Motor Engineering & Manufacturing North America, Inc." and insert -- Toyota Motor North America, Inc. --.

Signed and Sealed this
Second Day of August, 2022

Katherine Kelly Vidal
*Director of the United States Patent and Trademark Office*